(12) United States Patent
Nasukawa et al.

(10) Patent No.: US 8,140,438 B2
(45) Date of Patent: Mar. 20, 2012

(54) METHOD, APPARATUS, AND PROGRAM PRODUCT FOR PROCESSING PRODUCT EVALUATIONS

(75) Inventors: Tetsuya Nasukawa, Fujisawa (JP); Hideo Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1532 days.

(21) Appl. No.: 11/595,407

(22) Filed: Nov. 9, 2006

(65) Prior Publication Data

US 2007/0162397 A1   Jul. 12, 2007

(30) Foreign Application Priority Data

Dec. 27, 2005   (JP) ................................. 2005-376579

(51) Int. Cl.
*G06Q 30/00*   (2012.01)
(52) U.S. Cl. ..................... 705/54; 705/14.49; 705/14.54
(58) Field of Classification Search ................... 705/54, 705/14.44, 14.49, 14.6, 14.73, 14.54, 14.64, 705/14.69, 10
See application file for complete search history.

(56) References Cited

U.S. PATENT DOCUMENTS

| | | | | | |
|---|---|---|---|---|---|
| 5,974,398 | A * | 10/1999 | Hanson et al. | ............. | 705/14.64 |
| 6,011,537 | A * | 1/2000 | Slotznick | ..................... | 715/733 |
| 6,073,167 | A * | 6/2000 | Poulton et al. | ................ | 709/206 |
| 6,151,600 | A * | 11/2000 | Dedrick | ................................ | 1/1 |
| 6,182,027 | B1 * | 1/2001 | Nasukawa et al. | ................ | 704/2 |
| 6,804,659 | B1 * | 10/2004 | Graham et al. | ............ | 705/14.49 |
| 6,839,680 | B1 * | 1/2005 | Liu et al. | .......................... | 705/10 |
| 6,876,984 | B2 * | 4/2005 | Tadayon et al. | ................. | 705/51 |
| 6,934,743 | B2 * | 8/2005 | Huat | .............................. | 709/218 |
| 7,085,741 | B2 * | 8/2006 | Lao et al. | ......................... | 705/51 |
| 7,149,722 | B1 * | 12/2006 | Abburi | ............................ | 705/59 |
| 7,266,202 | B1 * | 9/2007 | Kawakami et al. | ............ | 380/283 |
| 7,353,541 | B1 * | 4/2008 | Ishibashi et al. | ................ | 726/26 |

(Continued)

FOREIGN PATENT DOCUMENTS

JP   2001243256   9/2001

(Continued)

OTHER PUBLICATIONS

Toriyama, "Mass media in near tempestuous future", Knowledge Creation and Integration, Nomura Research Institute, Dec. 26, 2005, vol. 14, pp. 80-93.

*Primary Examiner* — C. Michelle Tarae
*Assistant Examiner* — Adam Chornesky
(74) *Attorney, Agent, or Firm* — Yee & Associates, P.C.; Tom Tyson (57) ABSTRACT

A technique for determining a match between a character string including an evaluation and product information stored in a storage device and including a feature description of a product. The character string includes a name of an evaluation object to be evaluated and an evaluation expression representing the evaluation of the evaluation object. The matching method includes a first determining step of determining from the evaluation object and the evaluation expression whether the evaluation expression represents a positive evaluation of the evaluation object or a negative evaluation of the evaluation object; and a second determining step of determining, when the evaluation expression represents a positive evaluation of the evaluation object, if the evaluation expression is included in a feature description of a product, the product to be a matched product, and if the evaluation expression is not included in a feature description of a product, the product to be a mismatched product.

12 Claims, 6 Drawing Sheets

U.S. PATENT DOCUMENTS

| | | | |
|---|---|---|---|
| 7,660,581 B2* | 2/2010 | Ramer et al. | 455/432.3 |
| 2001/0029479 A1* | 10/2001 | Watanabe | 705/37 |
| 2002/0049738 A1* | 4/2002 | Epstein | 707/1 |
| 2004/0181759 A1* | 9/2004 | Murakami et al. | 715/532 |
| 2005/0091106 A1* | 4/2005 | Reller et al. | 705/14 |
| 2006/0026147 A1* | 2/2006 | Cone et al. | 707/3 |
| 2006/0062459 A1* | 3/2006 | Saito et al. | 382/181 |
| 2006/0155597 A1* | 7/2006 | Gleason | 705/14 |
| 2007/0027753 A1* | 2/2007 | Collins | 705/14 |
| 2007/0050389 A1* | 3/2007 | Kim et al. | 707/101 |
| 2007/0061196 A1* | 3/2007 | Axe et al. | 705/14 |
| 2007/0094082 A1* | 4/2007 | Yruski et al. | 705/14 |
| 2007/0162397 A1* | 7/2007 | Nasukawa et al. | 705/54 |
| 2007/0226051 A1* | 9/2007 | Addepalli et al. | 705/14 |
| 2008/0201222 A1* | 8/2008 | Lahaix | 705/14 |

FOREIGN PATENT DOCUMENTS

| | | |
|---|---|---|
| JP | 2002108924 | 4/2002 |
| JP | 2002297626 | 10/2002 |
| WO | 2004029758 A2 | 4/2004 |
| WO | 2004111771 A2 | 12/2004 |

* cited by examiner

METHOD, APPARATUS, AND PROGRAM PRODUCT FOR PROCESSING PRODUCT EVALUATIONS

BACKGROUND OF THE INVENTION

1. Field of the Invention

The present invention relates to a matching method, apparatus, and program for determining a match between a character string and a product.

2. Description of the Related Art

Recently, major companies have started running content-related advertisements that involve techniques for changing the content of advertisements according to information within text. These are basically techniques for changing the content of displayed advertisements depending on keywords within a World Wide Web (WEB) page. However, since such a keyword-dependent technique provides a mechanism that simply allows an advertisement to be displayed basically whenever certain keywords appear within a WEB page, there may be a case where an unintended advertisement is placed. For example, an advertisement is placed even when text in which certain keywords appear contains a negative evaluation. This is the advertisement not intended by an advertiser.

3. Problems to be Solved by the Invention

An object of the present invention is to provide a method, apparatus, and program for determining a match between a character string and a product.

Another object of the present invention is to provide a method of creating a list of products that match a certain character string.

Another object of the present invention is to provide a method of displaying a list of products that match a certain character string.

Another object of the present invention is to provide a method and system for placing an advertisement appropriate for the content of a WEB page.

Another object of the present invention is to provide a method and system for placing an advertisement appropriate for the content of evaluation information described on a WEB page.

Another object of the present invention is to provide a method and system for not displaying an advertisement inappropriate for the purpose of a WEB page.

Another object of the present invention is to provide a mechanism for selecting an appropriate advertisement from various advertisements for various product groups.

SUMMARY OF THE INVENTION

To achieve the objects such as those described above, the present invention provides a matching method for determining a match between a character string including an evaluation and product information stored in a storage device and including a feature description of a product. The character string includes a name of an evaluation object to be evaluated and an evaluation expression representing the evaluation of the evaluation object. The matching method includes a first determining step and a second determining step. The first determining step determines from the evaluation object and the evaluation expression whether the evaluation expression represents a positive evaluation of the evaluation object or a negative evaluation of the evaluation object. The second determining step determines, when the evaluation expression represents a positive evaluation of the evaluation object, if the evaluation expression is included in a feature description of a product, the product to be a matched product, and if the evaluation expression is not included in a feature description of a product, the product to be a mismatched product. Here, the product information may include categories of products, and the categories may be hierarchically arranged and represented by a plurality of nodes, each node being a group to which products belong. When the character string includes a name of an evaluation object to be evaluated and an evaluation expression representing the evaluation of the evaluation object, and when a category of a product is included in a category of the evaluation object, the first determining step may determine from the evaluation object and the evaluation expression whether the evaluation expression represents a positive evaluation of the evaluation object or a negative evaluation of the evaluation object. The feature description may include one or more feature names representing features and feature conditions describing conditions corresponding to the respective feature names. The second determining step may further include a determining step of determining, by using an antonym dictionary in which words representing feature conditions that are opposite to those in the product information are registered, when the evaluation expression represents a negative evaluation of the evaluation object, if the evaluation expression matches a feature condition opposite to that indicated in the feature description of a product, the product to be a matched product, and if the evaluation expression does not match a feature condition opposite to that indicated in the feature description of a product, the product to be a mismatched product.

The product information may include a name of a manufacturing or sales company of the product. When the evaluation expression represents a positive evaluation of the evaluation object, if the evaluation expression is included in a feature description of the product or if a company of the evaluation object is the same as the manufacturing or sales company of the product, the second determining step may determine the product to be a matched product, and if the evaluation expression is not included in a feature description of the product or if a company of the evaluation object is different from the manufacturing or sales company of the product, the second determining step may determine a product to be a mismatched product. When the evaluation expression represents a negative evaluation of the evaluation object, if the evaluation expression matches a feature condition opposite to that indicated in the feature description of the product or a company of the evaluation object is different from the manufacturing or sales company of the product, the second determining step may determine the product to be a matched product, and if the evaluation expression does not match a feature condition opposite to that indicated in the feature description of the product or a company of the evaluation object is different from the manufacturing or sales company of the product, the second determining step may determine the product to be a mismatched product. Furthermore, there may be a plurality of products. The matching method may further include an adding step of adding a product determined to be a matched product to a matched product list, and a product determined to be a mismatched product to a mismatched product list, with respect to each of the plurality of products. The matching method may further include a sorting step of sorting each of the matched and mismatched product lists by evaluation object, evaluation expression, feature name, feature condition, or the degree of match between evaluation information and product information.

The character string may be obtained from a WEB page, and the product information may include product images of the products. The matching method may further include a displaying step of displaying product images of products contained on the matched product list or product images of products contained on the mismatched product list. The matching method may further include a detecting step of detecting whether a displayed product image is selected, and a storing step of storing evaluation information in the storage device. The evaluation information is based on which whether a product represented by the selected product image is matched or mismatched is determined.

The present invention can also be considered as a program for enabling a computer to perform predetermined functions. In this case, the present invention provides a program for determining a match between a character string including an evaluation and product information stored in a storage device and including a feature description of a product. The program enables a computer to perform a first determining function and a second determining function. The first determining function is for determining from the evaluation object and the evaluation expression whether the evaluation expression represents a positive evaluation of the evaluation object or a negative evaluation of the evaluation object. The second determining function is for determining, when the evaluation expression represents a positive evaluation of the evaluation object, if the evaluation expression is included in a feature description of a product, the product to be a matched product, and if the evaluation expression is not included in a feature description of a product, the product to be a mismatched product.

With the present invention, it is possible to display an advertisement appropriate for page content by using evaluation information, and to provide a mechanism for placing effective product advertisements. Moreover, the present invention can contribute to an increased advertisement click through rate, since page content is analyzed based on evaluation information and thus an advertisement reflecting the analysis is displayed. In addition, by providing advertisers and content producers with various types of information (context information) associated with clicks, it becomes easier to formulate measures to further increase the click through rate.

REFERENCE NUMERALS

110: evaluation information extracting section
120: match/mismatch determining section
140: product information
150: category dictionary
160: antonym dictionary
200: CPU
210: host controller
220: I/O controller
230: ROM
240: RAM
245: drive
250: communication interface
260: sound controller
265: sound input/output device
270: graphics controller
275: display device
280: hard disk drive
285: flexible disk
290: multi combo drive
295: disk medium
310: ROOT
510: category determining unit
520: positive/negative determining unit
530: matching unit
610: portal site
620: content-related advertisement delivery system
630: blog
650: product information
1000: computer

DETAILED DESCRIPTION OF THE PREFERRED EMBODIMENT

The best mode for carrying out the present invention (hereinafter referred to as "embodiment") will now be described in detail with reference to the attached drawings.

Figure 1:
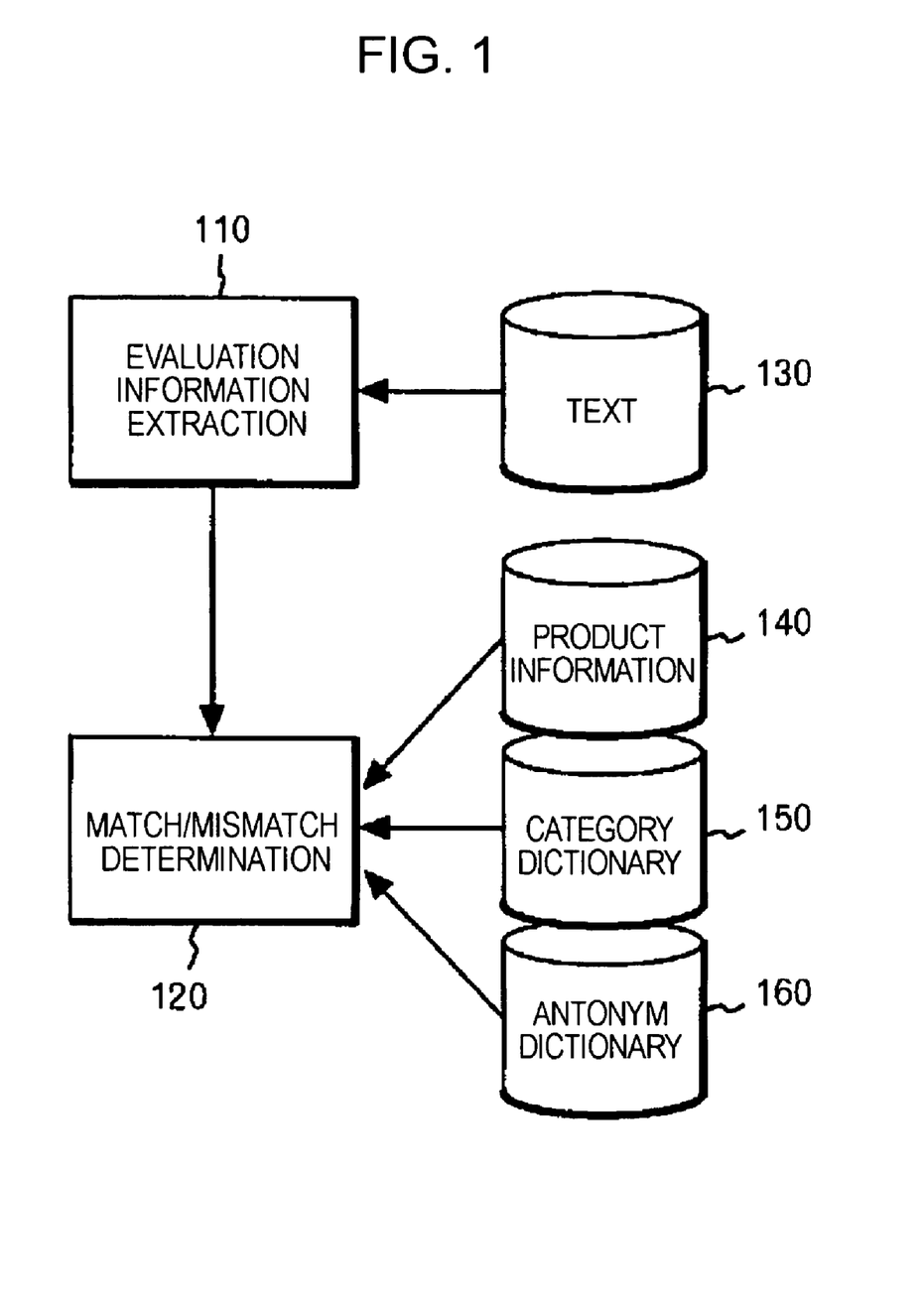
FIG. 1 illustrates a system configuration according to the present embodiment.

FIG. 1 illustrates a system configuration of the present embodiment. An evaluation information extracting section 110 reads a character string from text 130 to extract evaluation information. The text 130 can be any text. Preferred examples of the text 130 include text containing evaluations, comments, opinions, or the like. A character string may be extracted from a WEB page or may be input from a keyboard. In the present invention, a match between the character string and prestored product information is determined. The evaluation information extracting section 110 extracts evaluation information to be used in the determination. In the present specification, the term "evaluation information" refers to information that includes favorable/unfavorable evaluations, necessity/unnecessity determinations, opinions, or requests. The evaluation information includes an evaluation object to be evaluated and an evaluation of the evaluation object. For the extraction of evaluation information, a character string is checked to see if it contains an evaluation object to be evaluated and an evaluation expression representing the evaluation of the evaluation object. Then, on the basis of the evaluation object and evaluation expression, it is determined whether the evaluation expression represents a positive evaluation or negative evaluation of the evaluation object. For example, an evaluation expression for an evaluation object "DVD recorder BBB" contained in a character string "DVD recorder BBB provides a long recording time" is determined to be positive. A method of extracting an evaluation expression from text to determine whether the extracted expression is positive or negative is not described in detail here, as the method is already known as an evaluation analysis.

A match/mismatch determining section 120 determines whether an evaluation extracted by the evaluation information extracting section 110 matches certain product features. When an evaluation expression represents a positive evaluation of an evaluation object, if the evaluation expression is included in a feature description of a product, the product is determined to be a matched product, and if the evaluation expression is not included in a feature description of a product, the product is determined to be a mismatched product. For the determination, the match/mismatch determining section 120 refers to product information 140, a category dictionary 150, and an antonym dictionary 160. The product information 140 is information about products. Preferably, the product information 140 includes a product name, a company name, and a feature description for each product. The feature description is a description of product features. The feature description can include a feature name and a feature condition. The feature name is indicated by a word, such as weight, recording time, or size that represents the feature of the product. The feature condition is indicated by a word, such as light, long, or large that represents the condition of the feature. Each product can have multiple feature descriptions. The category dictionary 150 is managed using a tree structure. Groups to which products belong are stored in the category dictionary 150.

Figure 3:
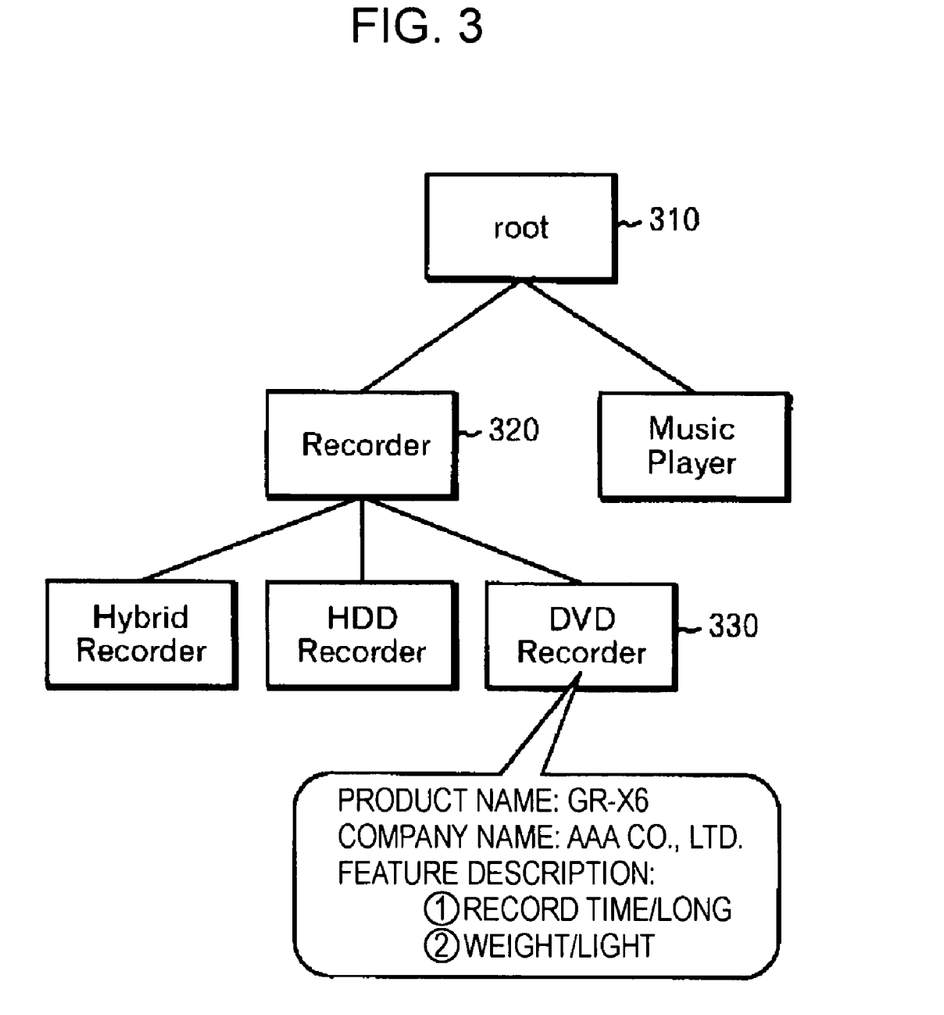
FIG. 3 illustrates a category dictionary.

FIG. 3 illustrates an exemplary structure of such a category dictionary. A ROOT 310 is the top category into which all products fall. The ROOT 310 has a sub-category called Recorder 320, which has a sub-category called DVD Recorder 330. The DVD Recorder 330 contains product information, including product names, company names, and feature descriptions. That is, the category dictionary is a dictionary that conceptually represents the functions of products in a hierarchical structure. Although products are categorized by function in FIG. 3, they may be categorized according to other concepts. For example, with respect to a character string "DVD recorder BBB provides a long recording time", a product with a product name "GR-X6" described in the feature description as providing a long recording time is determined to be a matched product. The antonym dictionary 160 is a dictionary in which words representing feature conditions that are opposite to those in product information are registered. The antonym dictionary 160 is used for effective determination in the match/mismatch determining section 120. Specifically, when an evaluation expression represents a negative evaluation of an evaluation object, if the evaluation expression matches a feature condition opposite to that indicated in the feature description of a product, the product is determined to be a matched product, and if the evaluation expression does not match a feature condition opposite to that indicated in the feature description of a product, the product is determined to be a mismatched product. For example, with respect to a character string "Recording time of DVD recorder CCC is short", a product with a product name "GR-X6" described in the feature description as providing a long recording time is determined to be a matched product.

Figure 5:
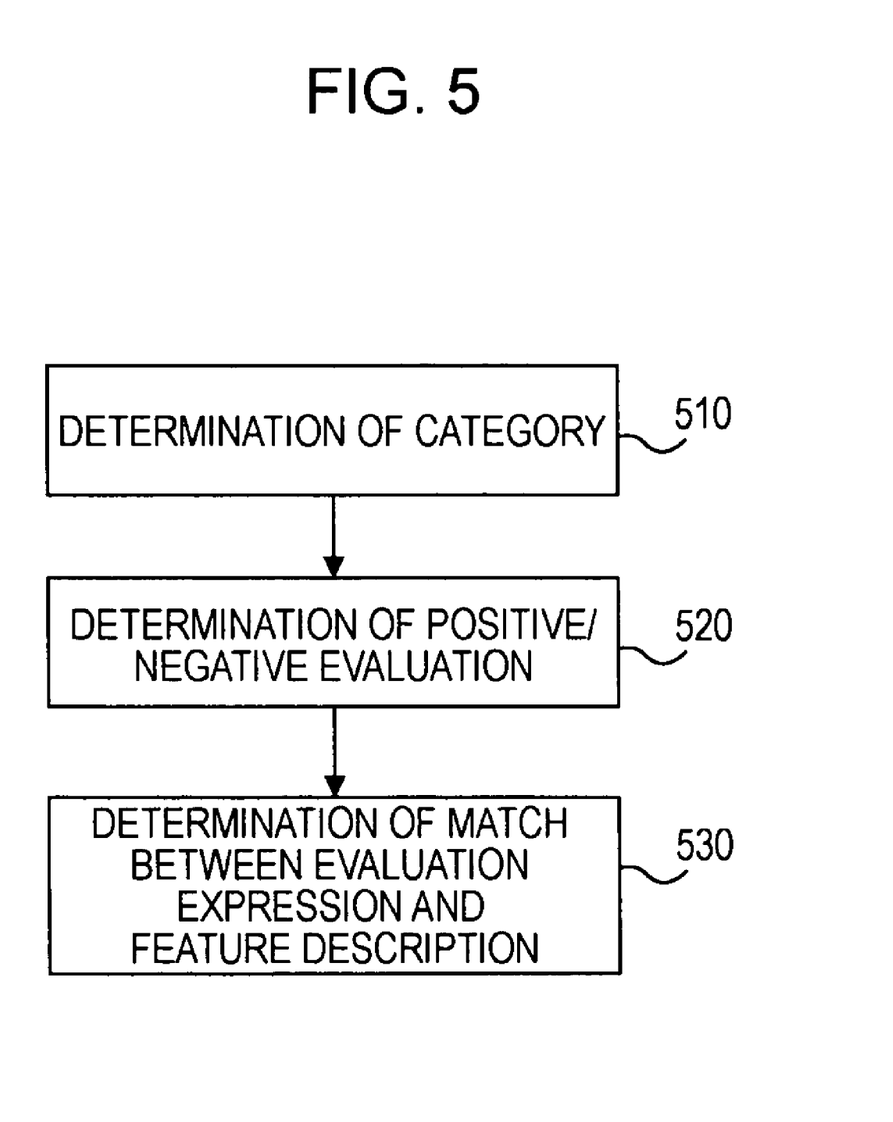
FIG. 5 is a detailed flowchart illustrating processing in the match/mismatch determining section.

FIG. 5 is a detailed flowchart illustrating processing in the match/mismatch determining section 120. A category determining unit 510 determines a match between the categories of an evaluation object and product. The categories are hierarchically arranged as illustrated in FIG. 3. The category determining unit 510 determines whether the category of the product is included in that of the evaluation object. Next, a positive/negative determining unit 520 uses a known evaluation analysis method to determine whether an evaluation expression represents a positive or negative evaluation of the evaluation object. A matching unit 530 determines whether the evaluation expression matches the content of the feature description. Of products registered in a node included in a tree structure and having a node in a category hierarchy to which the evaluation object belongs as a parent node, a matched product and a mismatched product are those corresponding to the following descriptions.

Matched Product

When an evaluation of an evaluation object is positive, if a manufacturing/sales company of the evaluation object is known, a product of the same company as that of the evaluation object is a matched product. If a manufacturing/sales company of the evaluation object is not known, a product having a feature that matches the evaluation expression is a matched product.

When an evaluation of an evaluation object is negative, if a manufacturing/sales company of the evaluation object is known, a product of a different company from that of the evaluation object is a matched product. If a manufacturing/sales company of the evaluation object is not known, a product having a feature opposite to that described in the evaluation expression is a matched product. The antonym dictionary 160 is used to determine whether a given feature is opposite to that described in the evaluation expression.

Mismatched Product

When an evaluation of an evaluation object is positive, if a manufacturing/sales company of the evaluation object is known, a product of a different company from that of the evaluation object is a mismatched product. If a manufacturing/sales company of the evaluation object is not known, a product having a feature opposite to that described in the evaluation expression is a mismatched product. The antonym dictionary 160 is used to determine whether a given feature is opposite to that described in the evaluation expression.

When an evaluation of an evaluation object is negative, if a manufacturing/sales company of the evaluation object is known, a product of the same company as that of the evaluation object is a mismatched product. If a manufacturing/sales company of the evaluation object is not known, a product having a feature that matches the evaluation expression is a mismatched product.

Matched products are preferably sorted in descending order according to the degree of match. Mismatched products are preferably sorted in ascending order according to the degree of match. The degree of match is an index indicating the degree of match between evaluation information (evaluation object and evaluation expression) and product information. For example, the degree of match is obtained by quantifying the degree of match of, for example, company names, features, and registration dates. Sorting by evaluation object, evaluation expression, feature name, and feature condition are also possible.

Figure 4:
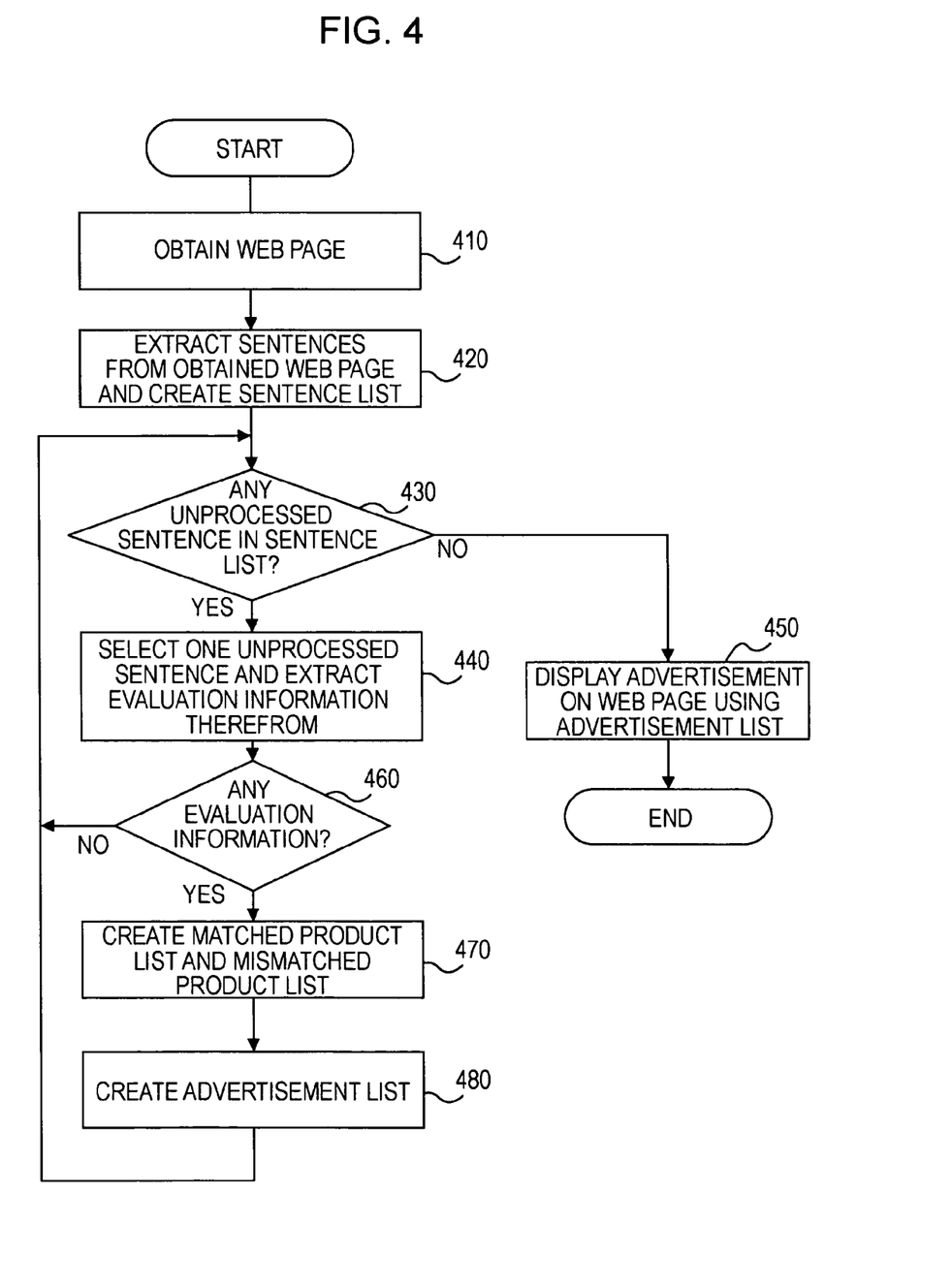
FIG. 4 is a flowchart illustrating a procedure in which a matched product is displayed on the basis of evaluation information appearing on a WEB page.

FIG. 4 is a flowchart illustrating a procedure in which input character strings are obtained from a WEB page and an advertisement for a matched product is displayed. The procedure is based on the premise that character strings to be processed are sentences appearing on the WEB page, and production information includes product images. First, the WEB page is obtained in step 410. Next, in step 420, sentences are extracted from the obtained WEB page to create a sentence list. In step 430, it is determined whether there is an unprocessed sentence on the sentence list. If there is, the process proceeds to step 440. If there is no unprocessed sentence on the sentence list, the process proceeds to step 450. In step 440, one unprocessed sentence is selected to extract evaluation information therefrom.

Although evaluation information is automatically extracted in the present invention, a content owner (author or creator) may explicitly embed evaluation information in the page using tag format, such as extensible markup language (XML) tag format. The following shows an example in which evaluation information is embedded using XML tags. There is basically no restriction on tag names and the like as long as evaluation information is described.

<eval label="P" grade="40">
<eval-object ontology="/hardware/renovo/note/thinkpad">DVD recorder BBB<eval-object>provides</eval-phrase>a long recording time</eval-phrase>.
</eval>

Moreover, with the method of the present invention, it is possible to record information (context information), such as "what kind of evaluation has been recognized", "what kind of product advertisement has been placed", and "whether the product image (advertisement) has been clicked". Such information is valuable for advertisers to improve product development and advertising activities, and also useful for content producers to track the preferences of viewers.

Next, in step 460, if no evaluation information is found, the process returns to step 430. If evaluation information is found, the process proceeds to step 470 where a matched product list and a mismatched product list are created. Product images may be displayed as advertisements on the WEB page on the basis of the matched and mismatched product lists but more preferably, an advertisement list may be created in the next step 480. The advertisement list is a list that contains a matched product list, a mismatched product list, and display positions. Preferably, the display positions are determined such that product images are displayed near the related evaluation information. Then, the process returns to step 430. In step 450, advertisements (product images) are embedded in the WEB page using the advertisement list. Preferably, each product image includes an image and an advertisement message. Possible ways of displaying advertisements (product images) are as follows:

Display matched products only.
Display matched products and mismatched products in different areas.
Display products with a distinction between matched and mismatched products.

Figure 2:
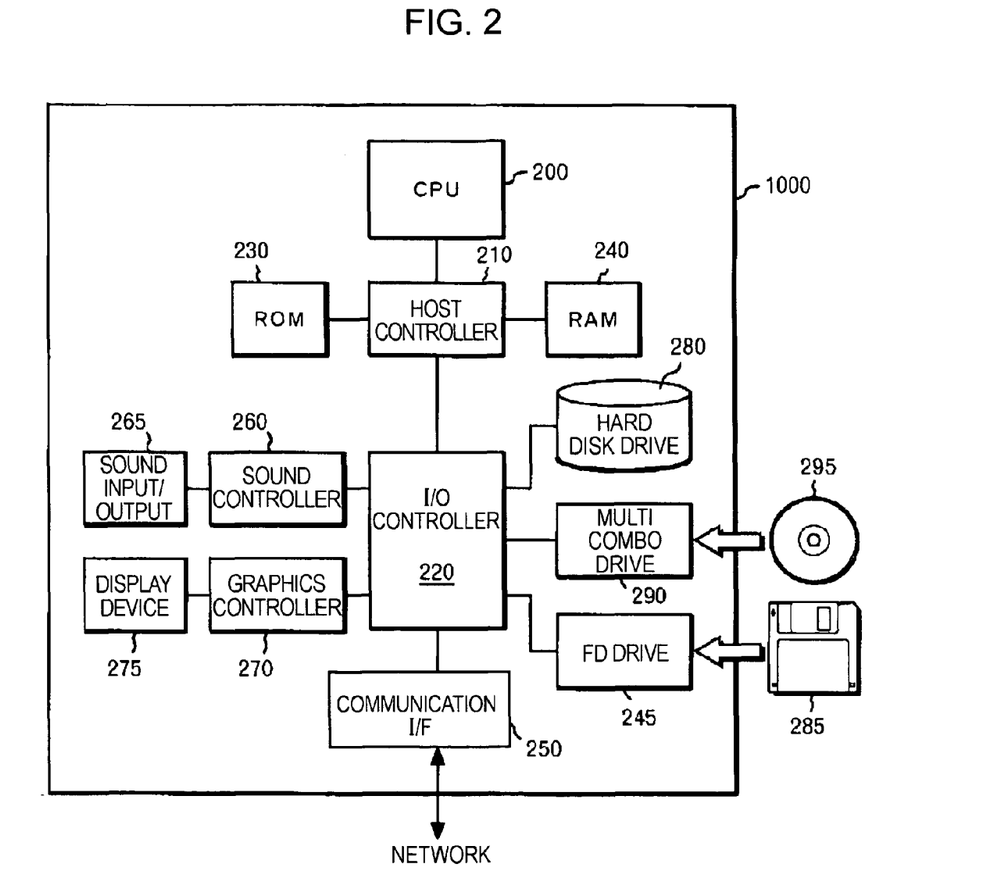
FIG. 2 illustrates an exemplary hardware configuration of a computer suitable for use in the present embodiment.

FIG. 2 illustrates an exemplary hardware configuration of a computer suitable for use in the present embodiment. A computer 1000 includes a central processing unit (CPU) 200 and its peripheral devices, including a random-access memory (RAM) 240, a read-only memory (ROM) 230, and an input/output (I/O) controller 220, which are connected to one another by a host controller 210; and a communication interface 250, a hard disk drive 280, a multi combo drive 290 capable of reading and writing a disk medium 295 such as a compact disk (CD) or a digital versatile disk (DVD), a flexible disk (FD) drive 245 capable of reading and writing a flexible disk 285, a sound controller 260 for driving a sound input/output device 265, and a graphics controller 270 for driving a display device 275 that are connected by the I/O controller 220.

The CPU 200 operates on the basis of programs stored in the ROM 230, a basic input/output system (BIOS), and the RAM 240 to control each component. The graphics controller 270 obtains image data generated by the CPU 200 or the like on a frame buffer in the RAM 240, and displays the obtained image data on the display device 275. Alternatively, the graphics controller 270 may include a frame buffer in which image data generated by the CPU 200 or the like is to be stored.

The communication interface 250 communicates via a network with external communication devices. Preferably, data including a character string is received through the communication interface 250. Then, a matching apparatus of the present invention extracts evaluation information from text, creates a list of products that match the extracted evaluation information, and delivers advertisements. Examples of the network include a wired network, a wireless network, an infrared network, and a short-distance wireless network, such as BLUETOOTH. Any of these networks can be used for connection without changing the configuration of the present application. Data and code, such as a program of the present invention, applications, and an operating system (OS) that are used by the computer 1000 are stored in the hard disk drive 280. The multi combo drive 290 reads a program or data from the medium 295, such as a CD or a DVD. The program or data read from such a storage device is loaded in the RAM 240 and used by the CPU 200. The program of the present invention may either be supplied from an external storage medium or downloaded from the internal hard disk drive 280 or through the network. Preferably, the product information 140, the category dictionary 150, and the antonym dictionary 160 are stored in the hard disk drive 280.

The above-described program may be stored in an external storage medium. Examples of the storage medium include the flexible disk 285, a compact disk read only memory (CD-ROM), an optical recording medium such as a DVD or a phase-change disk (PD), an optical magnetic recording medium such as a magnetic disk (MD), a tape medium, and a semiconductor memory such as an integrated circuit (IC) card. A storage device, such as a hard disk or a RAM, in a server system connected to a private communication network or to the Internet may be used as a recording medium such that the program is downloaded therefrom via the network. As can be understood from the exemplary configuration described above, anything with normal computer functions can be used as hardware necessary for the present invention. For example, a mobile terminal, a portable terminal, and a household electrical appliance can also be used without any problem. FIG. 2 illustrates only an exemplary hardware configuration of a computer that implements the present embodiment. Hardware of the computer can be configured in various ways as long as the present embodiment is applicable.

EXAMPLES

Figure 6:
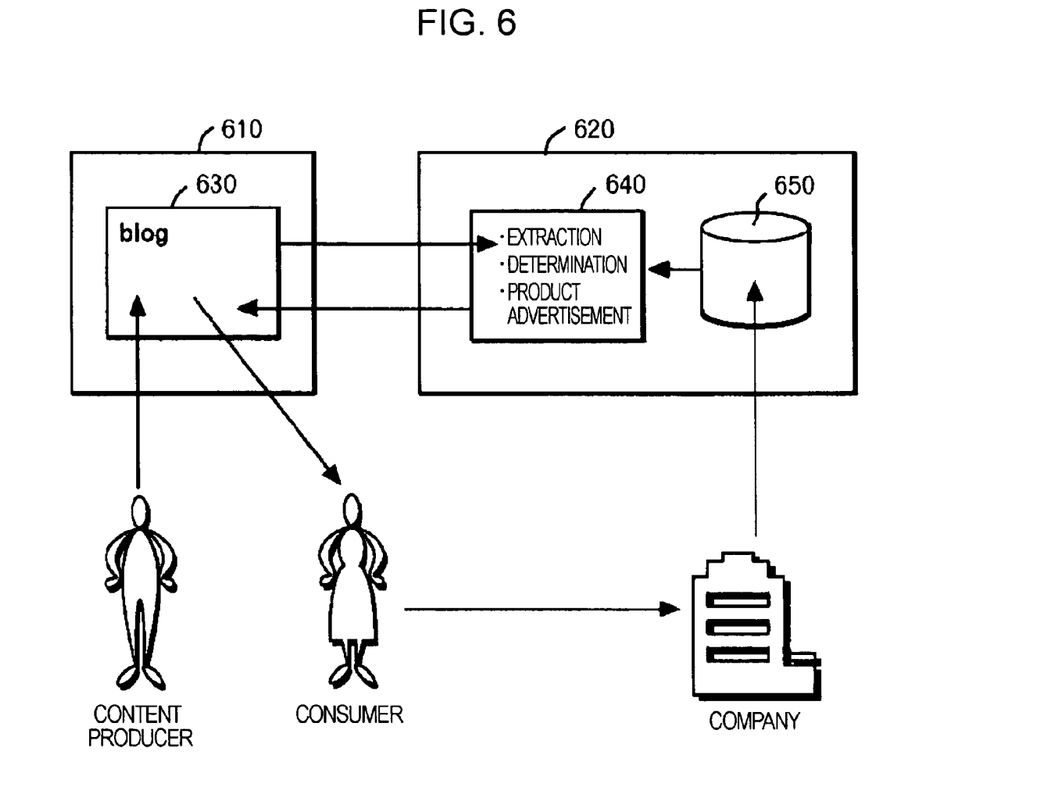
FIG. 6 illustrates an example in which the present invention is applied to a portal site.

FIG. 6 illustrates an example in which the present invention is applied to a blog (Weblog) 630 on a portal site 610. A content-related advertisement delivery system 620, which is the apparatus of the present invention, allows a content-related advertisement display to be automatically embedded in the blog 630 as a sidebar. A content producer describes evaluation information about various products on the blog 630. Since existing content-related advertisement systems are basically keyword-dependent, an expression, such as "YY function of XX is so bad that I have decided to buy ZZ", may cause an advertisement for the unpopular product "XX" to be displayed. The viewer will probably feel very strange about this and will not be likely to click on the displayed advertisement. On the other hand, the content-related advertisement delivery system 620 of the present invention allows a product advertisement to be displayed depending on whether the user evaluation is favorable. This means that basically an advertisement for "XX" will not appear in the case described above. This eventually increases the rate that the viewer clicks on a product image (advertisement). However, if the content producer wishes, it is possible to display advertisements for unpopular products. That is, advertisements can be displayed as intended by the content producer. The present invention is also applicable to a search site. The system can be created with exactly the same configuration by removing the "content producer" and replacing the "blog" with the "search site". Features of products can be described in product information 650 registered by a company (advertiser). Using the feature descriptions to select a matched product allows the appropriate selection of a product advertisement. This is advantageous for the company (advertiser) in that appropriate advertising activities can be performed by making full use of the features of its own products. In the example described above, when a consumer clicks on an advertisement on a WEB page, such as the blog 630, and purchases a product, part of the purchase price is passed on to an advertisement delivery system operating company, a portal site operating company, and a content creator of the original WEB page.

The invention claimed is:

1. A method performed by a computer, the method comprising:
   the computer determining a match between a character string including an evaluation of an evaluation object and product information stored in a storage device, wherein the character string includes a name of the evaluation object and an evaluation expression representing the evaluation of the evaluation object and the storage device includes a feature description of a product, including the computer determining from the evaluation object and the evaluation expression whether the evaluation expression represents a positive evaluation of the evaluation object or a negative evaluation of the evaluation object; and
   the computer determining, when the evaluation expression represents the positive evaluation of the evaluation object, if the evaluation expression is included in the feature description of the product, and if so the product is determined to be a matched product, and if the evaluation expression is not included in the feature description of the product, the product is determined to be a mismatched product.

2. The method according to claim 1, wherein the product information includes categories of products, and the categories are hierarchically arranged and represented by a plurality of nodes, each node being a group to which certain of the products belong, wherein the determining step that determines from the evaluation object and the evaluation expression whether the evaluation expression represents the positive evaluation of the evaluation object or the negative evaluation of the evaluation object is performed when a category of a product is included in a category of the evaluation object.

3. The method according to claim 2, wherein the feature description includes at least one feature name representing a feature of the product and a feature condition corresponding to the feature name.

4. The method according to claim 3, wherein the determining step that determines if the evaluation expression is included in the feature description of the product further comprises a step of determining, by using an antonym dictionary containing words representing feature conditions that are opposite to those in the product information, when the evaluation expression represents a negative evaluation of the evaluation object, if the evaluation expression matches a feature condition opposite to that indicated in the feature description of a product, and if so the product is determined to be the matched product, and if the evaluation expression does not match the feature condition opposite to that indicated in the feature description of a product, the product is determined to be the mismatched product.

5. The method according to claim 1, wherein the product information includes a name of a product company providing the product, and wherein the determining step that determines if the evaluation expression is included in the feature description of the product further comprises steps of:
   if the evaluation expression represents a positive evaluation of the evaluation object, determining if a company providing the evaluation object is same as the product company providing the product, and if so the product is determined to be the matched product, and if the company providing the evaluation object is different from the product company providing the product, the product is determined to be the mismatched product; and
   if the evaluation expression represents a negative evaluation of the evaluation object, determining if a company providing the evaluation object is different from the product company providing the product, and if so the product is determined to be the matched product, and if the company providing the evaluation object is different from the product company providing the product, the product is determined to be the mismatched product.

6. The method according to claim 1, wherein there are a plurality of products, and wherein the method further comprises an adding step of adding a first product determined to be the matched product to a matched product list, and adding a second product determined to be the mismatched product to a mismatched product list, for each of the plurality of products.

7. The method according to claim 6, further comprising a sorting step of sorting each of the matched and mismatched product lists by at least one of evaluation object, evaluation expression, feature name, feature condition, and degree of match between the evaluation information and the product information.

8. The method according to claim 6, wherein the character string is obtained from a WEB page, and the product information includes product images of the products, and wherein the matching method further comprising a displaying step of displaying at least one of (i) product images of products contained on the matched product list and (ii) product images of products contained on the mismatched product list.

9. The method according to claim 8, wherein the product images are displayed adjacent to the WEB page.

10. An apparatus for determining a match between a character string including an evaluation of an evaluation object and product information stored in a storage device, wherein the character string includes a name of the evaluation object and an evaluation expression representing the evaluation of the evaluation object and the storage device includes a feature description of a product, the apparatus comprising:
    a central processor unit (CPU), a computer readable memory, and a computer readable storage media;
    first program code to determine from the evaluation object and the evaluation expression whether the evaluation expression represents a positive evaluation of the evaluation object or a negative evaluation of the evaluation object; and
    second program code to determine when the evaluation expression represents the positive evaluation of the evaluation object, if the evaluation expression is included in the feature description of the product, and if so the product is determined to be a matched product, and if the evaluation expression is not included in the feature description of the product, the product is determined to be a mismatched product; and wherein
    the first and second program code are stored on the computer readable storage media for execution by the CPU via the computer readable memory.

11. A program product comprising a non-transitory computer readable storage medium having program code stored thereon for determining a match between a character string including an evaluation of an evaluation object and product information stored in a storage device, wherein the character string includes a name of the evaluation object and an evaluation expression representing the evaluation of the evaluation object and the storage device includes a feature description of a product, the program code enabling a computer to perform:
- a first determining function for determining from the evaluation object and the evaluation expression whether the evaluation expression represents a positive evaluation of the evaluation object or a negative evaluation of the evaluation object; and
- a second determining function for determining, when the evaluation expression represents the positive evaluation of the evaluation object, if the evaluation expression is included in the feature description of the product, and if so the product is determined to be a matched product, and if the evaluation expression is not included in the feature description of the product, the product is determined to be a mismatched product.

12. A method performed by a computer for displaying an appropriate product advertisement according to a character string including an evaluation of an evaluation object, the method comprising:
- the computer extracting from a WEB page the character string including a name of the evaluation object and an evaluation expression representing the evaluation of the evaluation object;
- the computer determining from the evaluation object and the evaluation expression whether the evaluation expression represents a positive evaluation of the evaluation object or a negative evaluation of the evaluation object;
- the computer determining a match between the evaluation expression and product information stored in a storage device, the storage device containing product images and feature descriptions of a plurality of products;
- the computer determining, when the evaluation expression represents the positive evaluation of the evaluation object, if the evaluation expression is included in a feature description of a product, and if so the product is determined to be a matched product, and if the evaluation expression is not included in a feature description of a product, the product is determined to be a mismatched product, with respect to each of the plurality of products;
- the computer adding a first product determined to be the matched product to a matched product list, and a second product determined to be the mismatched product to a mismatched product list, with respect to each of the plurality of products; and
- the computer embedding at least one of (i) a product image of a matched product contained on the matched product list and (ii) a product image of a mismatched product contained on the mismatched product list near the character string appearing on the WEB page, with respect to each of the plurality of products.

* * * * *